June 25, 1940.    J. A. CHAPPUIS    2,205,616
MACHINE FOR MAKING FASTENER STRINGERS
Filed May 5, 1933    7 Sheets-Sheet 1

INVENTOR.
John A. Chappuis
BY Kelley and Chisholm.
ATTORNEYS.

June 25, 1940.   J. A. CHAPPUIS   2,205,616
MACHINE FOR MAKING FASTENER STRINGERS
Filed May 5, 1933   7 Sheets-Sheet 3

INVENTOR
John A. Chappuis.
BY Kelley & Chisholm.
ATTORNEYS.

June 25, 1940.   J. A. CHAPPUIS   2,205,616
MACHINE FOR MAKING FASTENER STRINGERS
Filed May 5, 1933   7 Sheets-Sheet 4

INVENTOR.
John A. Chappuis
BY Kelley & Chisholm
ATTORNEYS.

June 25, 1940.　　　　J. A. CHAPPUIS　　　　2,205,616
MACHINE FOR MAKING FASTENER STRINGERS
Filed May 5, 1933　　　7 Sheets-Sheet 5

INVENTOR.
John A. Chappuis
BY Kelley & Chisholm
ATTORNEYS.

June 25, 1940.  J. A. CHAPPUIS  2,205,616
MACHINE FOR MAKING FASTENER STRINGERS
Filed May 5, 1933  7 Sheets-Sheet 6

INVENTOR.
John A. Chappuis
BY Kelley & Chisholm
ATTORNEYS.

INVENTOR.
John A. Chappuis
BY Kelley & Chisholm
ATTORNEYS.

Patented June 25, 1940

2,205,616

UNITED STATES PATENT OFFICE 2,205,616

MACHINE FOR MAKING FASTENER STRINGERS

John A. Chappuis, Peseux, Switzerland, assignor to Talon, Inc., a corporation of Pennsylvania Application May 5, 1933, Serial No. 669,615
In France May 2, 1932

2 Claims. (Cl. 153—1)

My invention relates to the manufacture of slide fastener stringers and the general object is to provide an improved machine for use in such manufacture.

Slide fasteners usually comprise two sets of small fastener members firmly fixed to tapes or the like, and a slider mounted to move along the members for quickly interlocking or disengaging the fastener members. The manufacture of the fastener member assemblies presents many difficult problems. The fastener members must be strong and accurately shaped into a very irregular but definite form. They should be made smooth and provided with a good finish preferably by plating. To get a good finish the members must be released after their formation and be tumbled or plated in loose masses. There is next the problem of picking up the tiny irregular members and feeding them to an assembly machine. The projections or heads on the interlocking end must all extend the same way and the members otherwise oriented in exactly the same way to enable them to be handled by the assembly mechanism. Then, they must be set firmly on the edge of the tape and their spacing must be exceptionally accurate. All the operations must be carried out at relatively high speeds since a large number of parts must be sold for a few cents.

I am aware of a prior machine and method which solves all of the above problems. Such machine is disclosed in the patent to Roscoe J. Smith No. 1,903,659, issued April 11, 1933. But my machine and method differ in many respects from the Smith machine and method, and involve some novel basic features. The present machine is exceedingly simple in construction and operation; it is compact and particularly adaptable to dual construction and operation; it makes a good product free from many of the defects of products from other machines.

More particularly some of the objects are as follows: to avoid as much as possible having to remove improperly placed fastener members from the chute by delicate fingers or by hand; to provide a method of collecting fastener elements in a solid column or pack formation, that is, nested together with their flat faces abutting against each other; to simplify the problem of control of the fastener members at the time of their attachment to the tape; and other objects which will later appear.

To these ends, the fastener members are preferably fed or distributed in such a manner that they lie flat against a guide surface, that is with their flat sides all substantially in the same plane. An orienting device and conducting means is interposed in the pack of the members so fed, so that all members which approach the same in the proper position are caught and fed along thereby to the desired point. An important feature at this stage is that members approaching the orienting means in improper position are deflected automatically, and prevented from entering the conducting means where they would clog or jam the device. A collecting device is next provided for putting the oriented members in a pack, and again provision is made for the free ejection automatically of members which do not immediately fit into the pack properly. The assembly mechanism preferably has means for guiding the tape in position for easy attachment of the end member of the pack, means for advancing the tape and attached member, which is thus separated from the pack, and means for locating the next member of the pack in position for attachment to the tape.

In the accompanying drawings I have shown one of the many practical embodiments of my invention and a modification thereof.

Figs. 12a, 12b, 12c, 12d, 12e, 12f, 12g and 12x are cross-sectional views taken on lines a—a,

*b—b, c—c, d—d, e—e, f—f, g—g* and *x—x* respectively of Fig. 11.

Fig. 12*y* is a cross section through the entrance end of the guideway.

The particular embodiments illustrated will now be described in specific language, which is used, not by way of limitation, but only to facilitate understanding of the invention.

Figure 1:
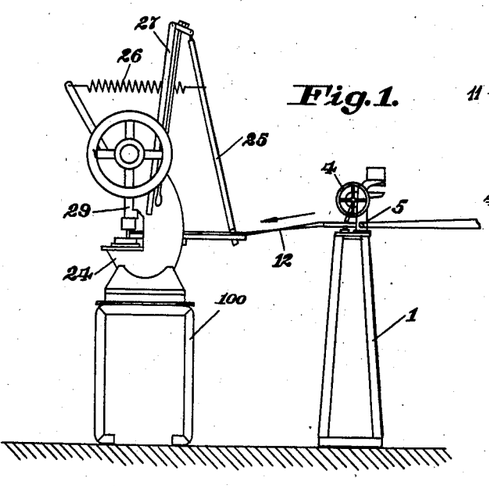
Fig. 1 is a schematic elevation view showing the plan of installation.
Figure 2:
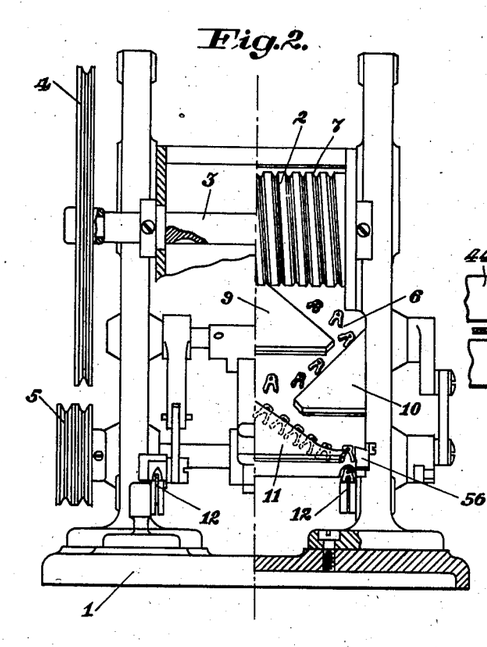
Fig. 2 shows partly in elevation and partly in section the part of machine which aligns the fastener elements.
Figures 3, 3A, 3B, 4, 5, 7:
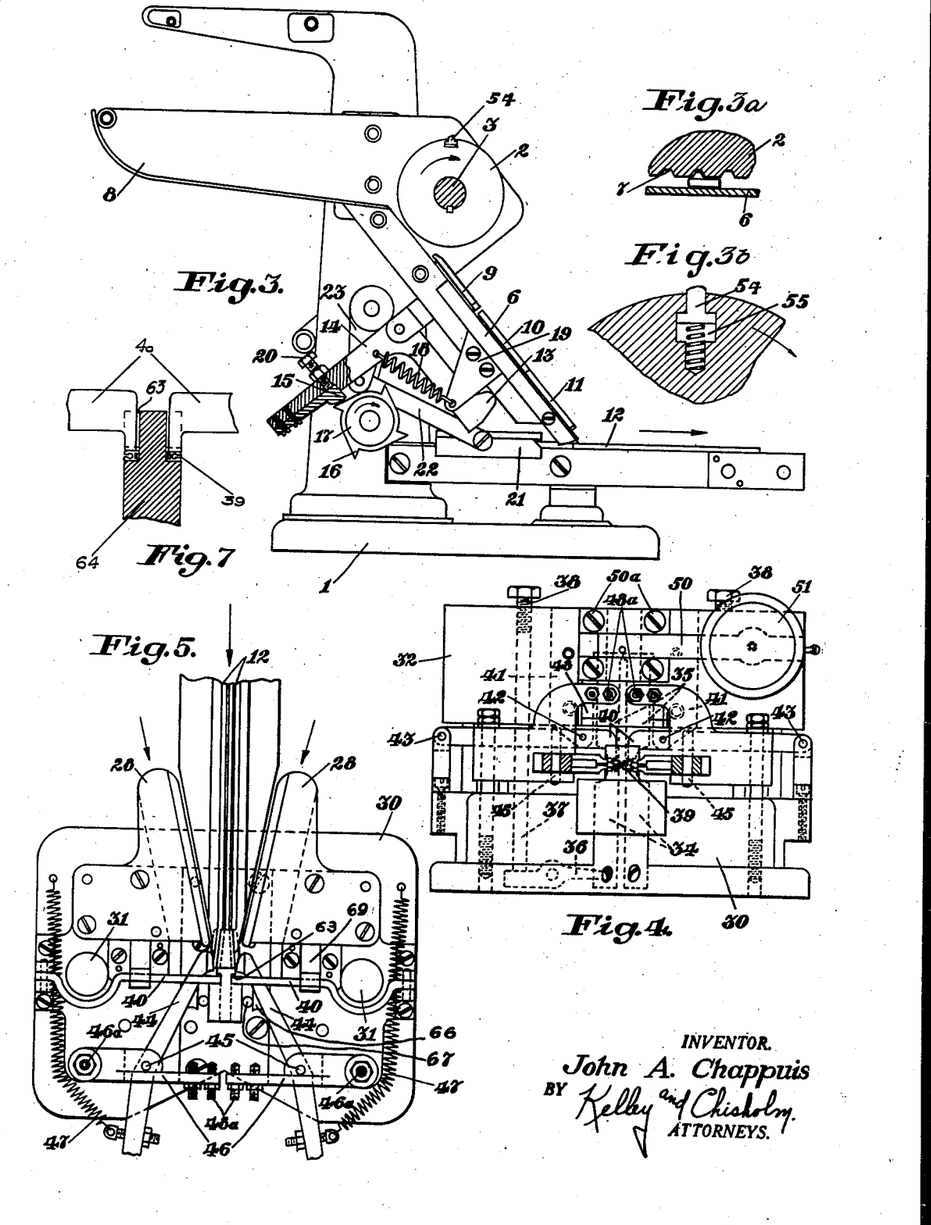
Fig. 3 is a side view of the aligning or feeding mechanism.
Fig. 3a is a fragmentary longitudinal sectional view through the roller and guide surface.
Fig. 3b is a fragmentary cross-sectional view through the roller.
Fig. 4 is a front elevation partly in section of the applying mechanism.
Fig. 5 is a plan view of the clamping mechanism with the slide block removed.
Fig. 7 is a cross-sectional view through the guideway immediately behind the clamping tools.

In Figure 1 the numeral 1 indicates the aligning or hopper feed mechanism, while 100 indicates the fastener chain assembly mechanism. Referring to Figs. 2 and 3 the fastener members are placed in loose condition in a container 8 and if desired, a device may be provided for continuously feeding loose members to the container. The fastener members gravitate toward the inclined plane surface 6 and thus approach the initial selection means. A suitable notched member, preferably in the form of a roller or cylinder 2 turned on an axis 3 by pulleys 4, 5, and having grooves 7, is mounted parallel to the inclined plate and its guide surface 6, and spaced therefrom only slightly more than the thickness of the flat portion of the fastener member. The grooves 7 have a cross-section corresponding to the shape of the fastener member head. Thus the fastener members will pass along the inclined surface under the roller 2 only when the flat side opposite the head is against the guide surface 6 and the heads extending into the grooves. Preferably the grooves are helical which tends to move the fastener members from opposite ends toward the center; also at least one notch will come into registry with a fastener member head during each revolution of the roller regardless of its exact position relative to the ends of the roller. With this form of selecting device it is important that the slot or space between the guide surface and the notched member be cleared at frequent intervals. Otherwise the space would become jammed and useless. For this purpose a brush or bar 54 extending the length of the space, is carried by the roller preferably to have sliding movement in the groove 55. It is spring pressed outwardly and has rounded edges so that it brushes over the guide surface and clears away all fastener members therefrom. From this point on the assembly mechanism is "duplex" so there are two lines of fastener members being fed and two duplicate clamping and tape control devices; therefore, only the portion to the right of the center line in Fig. 2 will be described. The inclined surface is continued for a suitable distance below the drum 7, and most of the fastener members will continue their descent without turning over. The baffle plates 9, 10, have inclined upper edges for the purpose of directing of fastener members to the orienting devices so that they do not strike the plate 11 at too high a velocity.

It will be noted that the plate 11 is spaced slightly from the guide surface 6 to provide a groove or slot 53 which is only slightly wider than the thickness of the flat portion of a fastener member. Thus, only the flat part of the members can enter the slot while the heads are caught on the inclined edge of the plate. The members thus caught, automatically orient themselves in the same way, that is with the flat portions depending vertically into the slot or groove. Any members which might approach the slot with the heads turned down will not enter but will slide along and drop away instead of lodging on the rail 12. It will be noted that all members which are not properly caught by the rail will drop away freely and not jam up in the pack. While the members are thus suspended by their heads they slide along to the stop member 56 and drop directly onto the rail 12. The sliding of the fastener elements along the inclined plane and the plates 9, 10 and 11 is facilitated by a hammer vibrator 13 on a bell crank lever 14 which has a pawl 15 engaging the teeth 16 on a ratchet wheel 17. The lever 14 is held by a spring 18 fixed to a support 19. A screw 20 regulates the position of the lever with respect to the pawl.

The fastener members are pushed away from their initial position on the rails 12 by sliding blocks 21 actuated through links 22 and arms 23. The rails are at first vertical but as they approach the clamping mechanism, they turn in a spiral in opposite directions 90° so as to present the fastener elements in a horizontal position with the jaws extending outwardly, the heads of the elements being turned toward the center of the mechanism. The packs of members at the lower ends thereof are urged along the rails 12 by levers 25 and springs 26. When the levers 25 strike the stop 27 a bell may be rung by suitable electric contacts (not shown) and the operator manually moves the levers 25 back to their initial position. The purpose of the bell is to inform the operator that the levers are approaching the end of their travel and that they should be moved back along the rails to catch another bunch of fastener members.

Figure 12:
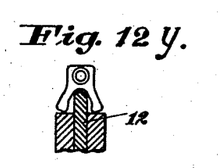
Figures 12A, 12B, 12C, 12X:
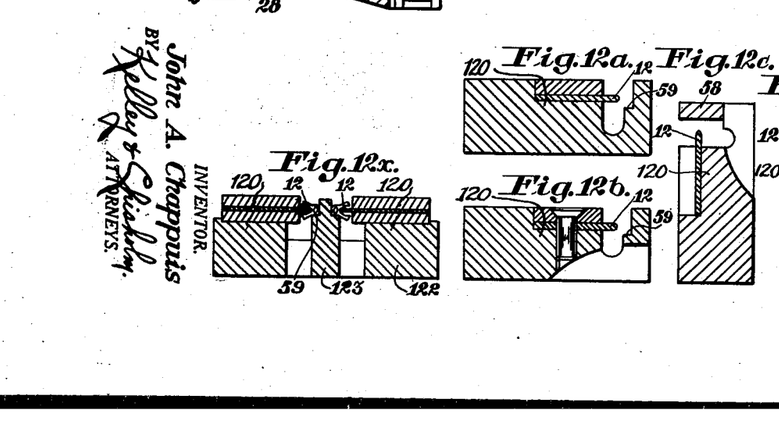
Figures 12D, 12E, 12F, 12G:
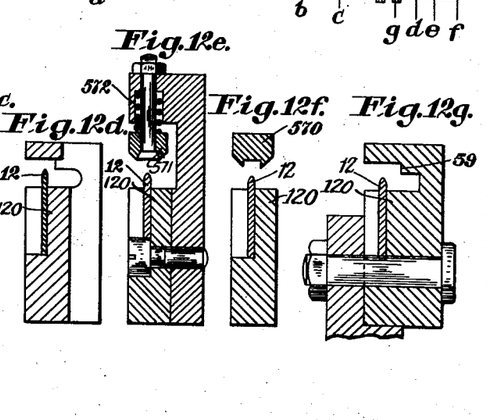

Referring now more particularly to the construction of the guideway for receiving and guiding the members in pack formation, the rails 12 are hardened steel blades held in supporting bars 120 and having rounded ends to fit in the bifurcations of the fastener members. When the supporting bars converge together as at the section *x—x*, the guide rails are supported by a single member 122 having the middle partition 123 forming a guide for the packs of members. As seen in Figure 12*y*, at the entrance end spaces above the rails are open to permit easy access thereto and the automatic escape of any members which may inadvertently get in the pack in improper position. In order to assure perfect alignment of the members before passing further along the guideway a control bar 510 is resiliently mounted above each rail and has overhanging edges at its entrance end. This member will yield upwardly a slight amount and tends to guide or push into position any member which projects above the pack but normally exerts no force on the fastener members. This bar is attached to blades 571 which have a sliding connection in the overhanging bracket 124 whereby they move upwardly a small distance against the compression of springs 572. A further open space may be left above the rail to the left of the control bar 570. Then the members pass under a guide piece 58 extending parallel to the rail 12 to the clamping mechanism. Guide piece 58 carries a ledge 59 beginning at the point where the guideway starts to turn from the vertical to the horizontal position, which supports the head ends of the members in the pack. The guideway is preferably open at the back and at the front to allow easy removal of members which get into improper positions, which may occur accidentally, for example, when the pack is broken apart for any reason.

Figures 6, 15, 15A, 19:
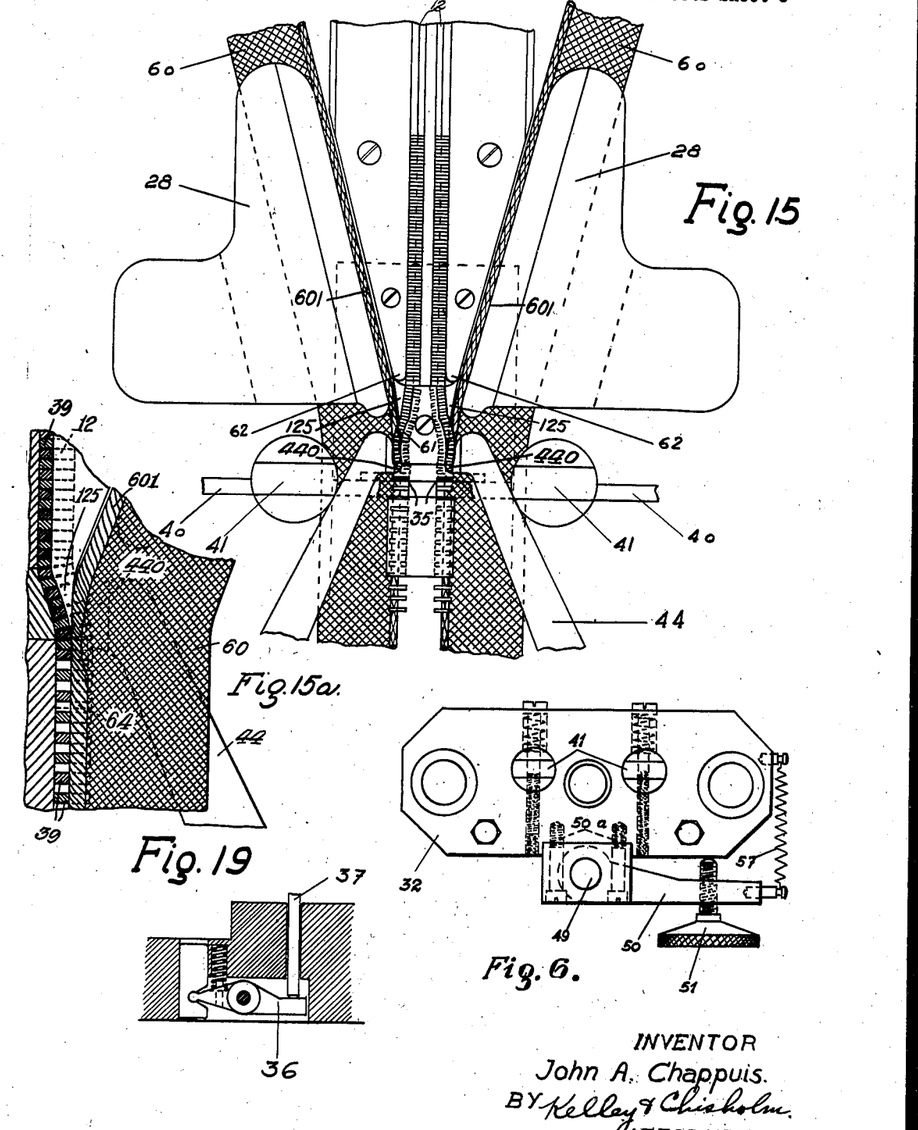
Fig. 6 is a plan view of the slide block and attached parts.
Fig. 15 is a plan view partly in section corresponding to Fig. 5 but on a larger scale and showing the fastener members and tape in place.
Fig. 15*a* is an enlarged detail sectional view of parts shown in Fig. 15, taken on the horizontal central plane of the fastener members.
Fig. 19 is a detailed sectional view showing mechanism for operating the bottom clamping tools.

Referring to Fig. 15 the tapes 60 are fed from rolls and through suitable adjustable tension devices which are not here shown as they are common in slide fastener making machines. The tapes are led through guides 28 which extend to a point closely adjacent the packs of members. At this point it will be noted that the partition 123 widens and the pack guides are curved outwardly as shown at 61 so that the bifurcated portions of the members will be pushed over the corded edges 601 of the tapes.

The guide rails 12 terminate in pointed ends 125 which are shown in plan view in Fig. 15a. These pointed ends extend between the fastener element jaws and along the cord edge of the tape so that the fastener members are definitely under control by the pointed ends 125 until the cord edges 601 are pushed into the spaces between the clamping jaws. These cord edges are firmly pushed into position just prior to clamping, by the thin edges 440 of the feeding hooks 44 which actually extend between the fastener member jaws.

Figures 13, 14, 22, 23, 24:
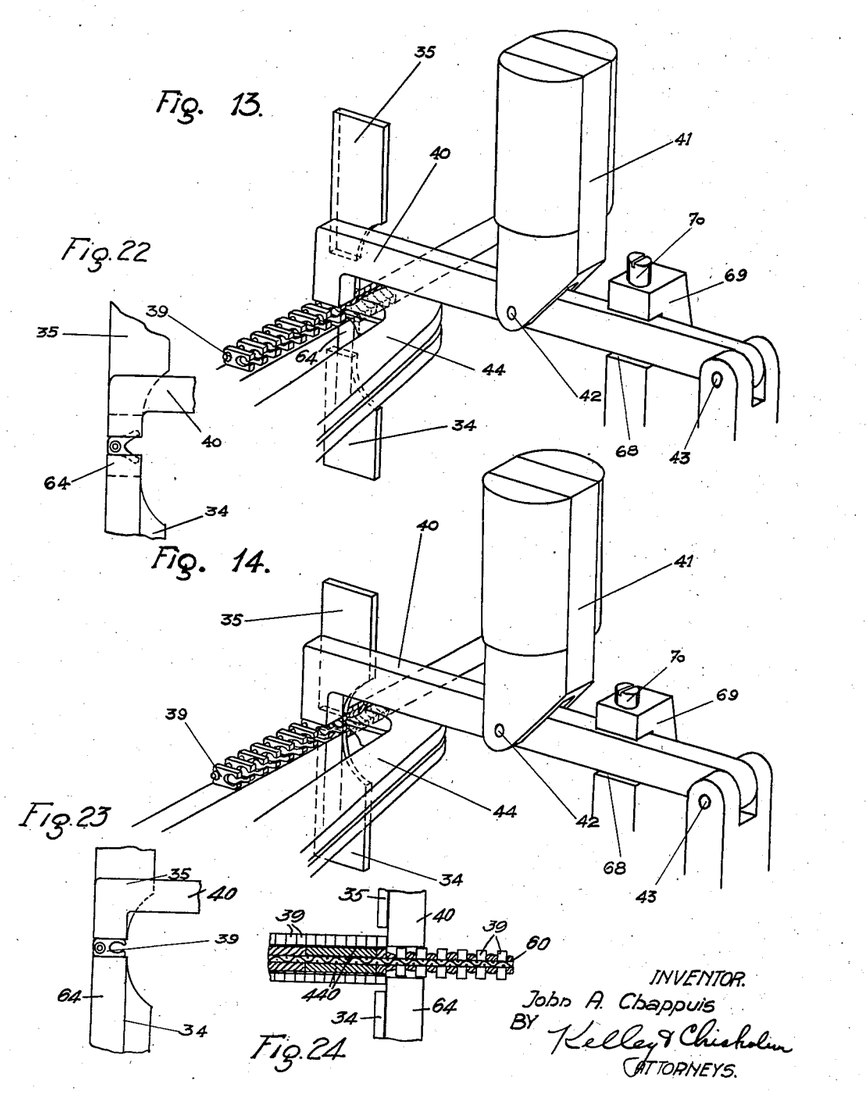
Figs. 13 and 14 are schematic illustrations of the clamping and tape feeding mechanism in different positions.
Figs. 22 and 23 illustrate the clamping and holding tools in the closed and open positions respectively of the clamping tools.
Fig. 24 is a longitudinal vertical section through the clamping, holding and feeding tools.
Figure 16:
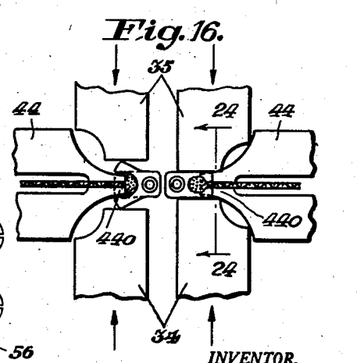
Fig. 16 is a vertical section showing the clamping tools.

The feeding of the stringers or tapes toward the clamping mechanism is accomplished by a pair of hooks 44 pivotally connected at 45 to oscillating arms 46 and held by springs 47 so that the hooks are always in engagement with the tapes. The levers 46 are pivoted at 46a and are oscillated by inclined plate cams 48 mounted on the upper block 32, said cams acting on screws 48a of the levers 46. The construction of these hooks should be noted, see particularly Figs. 13 and 14. They are bifurcated so as to straddle the tape. Their ends are tapered sharply and extend in a curve along the cord edges of the tapes as they approach the clamping stations. Since they are spring pressed against the cord edges, they serve to hold the cord edges definitely in position during clamping. The rails 12 carry the fastener members until they are astride the tape and the edges of the hooks, where they terminate in pointed ends 62.

The end of each member 40 is mounted in an arcuate guideway 63 in a stationary guide block 64 and the end member of the pack comes to rest against the end of member 40 when the bifurcated portions of the fastener member are open. It is thus accurately positioned for clamping to the tape. It will be noted that the movement of the arms 40 is extremely slight. The whole purpose of any movement is to make them act as a holder for the tape and attached fastener members during the retracting movement of the feeding hooks. Their other function, namely, of locating the fastener elements just prior to clamping, is performed while the arms are lifted up but the movement is so slight that they are not lifted up enough to permit the fastener element which has not been clamped on, to pass by. Immediately after clamping, however, the hooks 44 engage the element which has been clamped on and pull it forwardly, thus pulling the whole tape a definite uniform distance. The element is permitted to pass by the bar 40 since its clamping jaws are closed. The actual clamping is accomplished by four small plungers, two upper 35 and two lower 34. In Fig. 15 the plungers are shown in the clamping position. Now, when the clamping is accomplished the member is compressed sufficiently to permit it to pass under the member 40 when the tape is next stepped forward. The next member of the pack then comes to rest against the member 40 and the operations are repeated. The four plungers accomplish the clamping on the down stroke of the movable block 32, on which are mounted the two upper plungers 35, whose stroke is regulated by the eccentric shaft of the press; the lower plungers 34 are raised simultaneously by levers 36 and rods 37 which in turn, receive their movement from the block 32 and are regulated by screws 38. The levers 40 which are pivoted at 43 have a very limited movement, only a few thousandths of an inch. This movement is derived from two brake plungers 41 mounted in holes in the movable press head or block. The plungers have preferably fibre surfaces for the proper degree of sliding friction. On the up stroke the levers are lifted free of the fastener members to permit the stringer to be fed forward freely, and on the down stroke they press hard against the attached fastener members to prevent the tape from slipping back during the return movement of the hooks. This movement is definitely controlled by the sides of slot 68 in bracket 69; and for fine adjustments by screws 70.

The hooks are made to reciprocate in a straight line by the straight surfaces 66 on the hooks sliding on the stationary pins 67. In Fig. 15a the tape feeding operation is just starting. The thin pointed ends of the hooks are compressing the cord edge 601 and extend between the jaws of the open fastener members so that the hooks can catch on the closed fastener member. On the next forward movement of the hooks they will pull the tape forwardly by means of this fastener member which has just been clamped. The pack will then automatically move forward so that the next fastener member will be positioned against the stop formed by members 40 and 64.

The clamping plungers reciprocate in the same guideways as the levers 40 and directly against the surface of levers 40.

Figure 8:
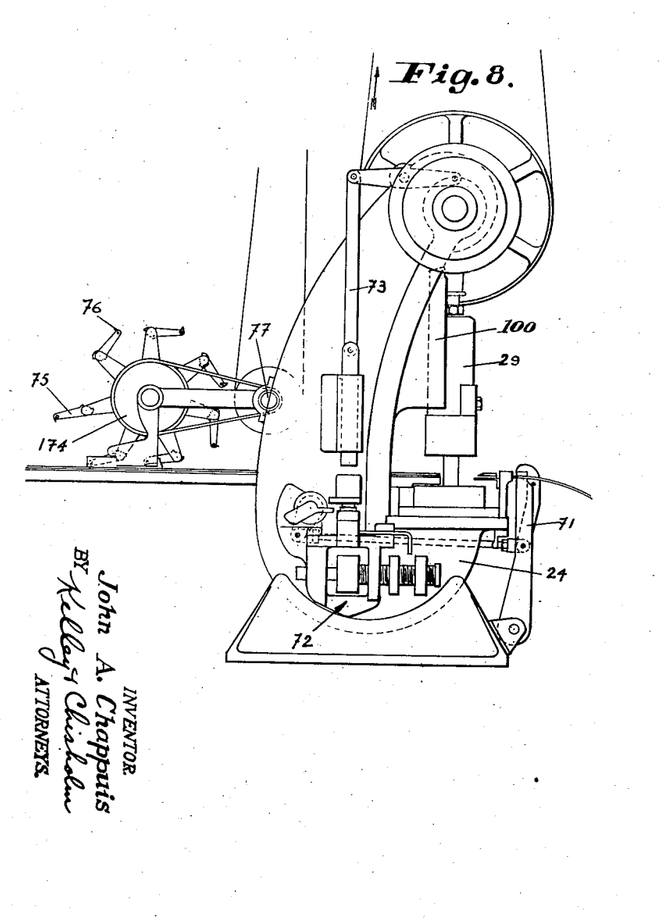
Fig. 8 is a side elevation view of the assembly mechanism.
Figure 9:
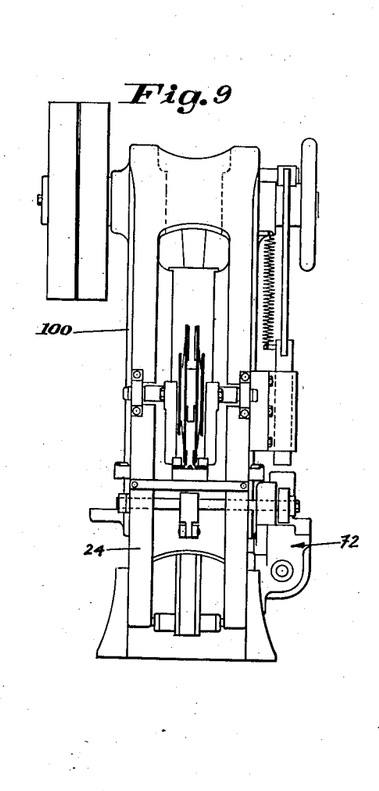
Fig. 9 is a front elevation of the assembly mechanism.
Figures 10, 11:
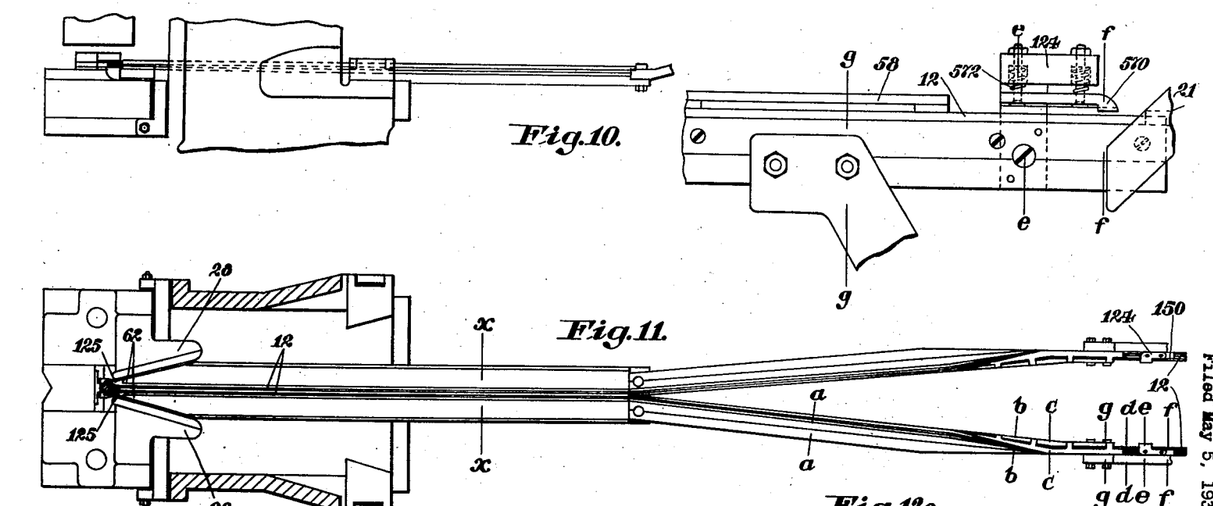
Fig. 10 is a side elevation view of the chute or guideway, the portion at the right being shown on a larger scale.
Fig. 11 is a plan view of the guideway.

The gap spacing between groups of members may be provided in any one of several ways. The machine may be quickly stopped for a short interval and the operator pull the tapes through by hand. Referring to Figs. 7 and 8 the tapes may be given a long feed automatically by a lever having suitable automatically releasing jaws for gripping the tape which is continuously placed under tension by a suitable roll. The control of lever 71 is through a suitable timing mechanism indicated generally by numeral 72 actuated by link 73 from the shaft on the press. The details of this timing mechanism will not be described since per se, it forms no part of the present invention. One suitable form is disclosed in Sundback 1,467,015.

The term "pack" or "pack formation" as used herein means a column of fastener members nested together in the manner shown in Figs. 15 and 15a, that is, with their flat faces toward each other and the projections and heads of the members nesting in the recesses of the adjacent members.

The feeding of the pack may be automatic if desired. Referring to Fig. 7, a wheel 174 carries a plurality of pivoted arms 75 each with a sharp finger 76. Influenced by a spring or by their own gravity the arms 75 cause the sharp point 76 to enter the pack of members and to pull them along. The wheel 74 is driven through a friction clutch 77 at a slow rate of speed and the clutch can be adjusted to exert the desired feeding force.

Figure 17:
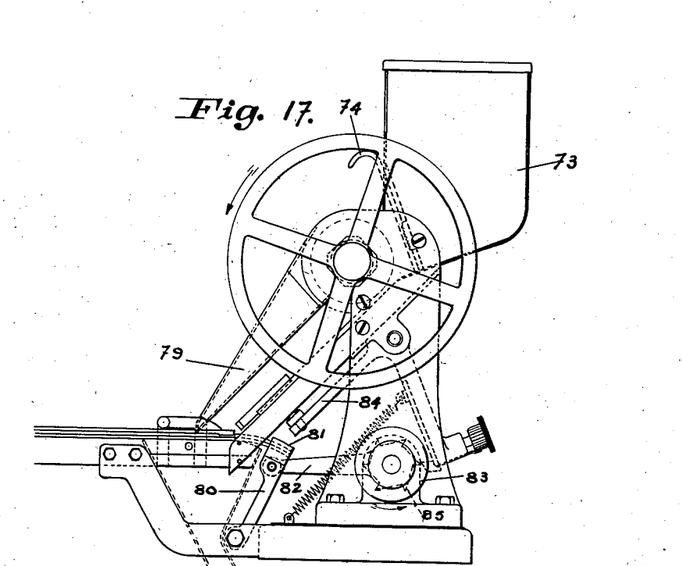
Fig. 17 is a side elevation and Fig. 18 is a front elevation of a modified form of fastener member aligning and feeding mechanism.
Figure 18:
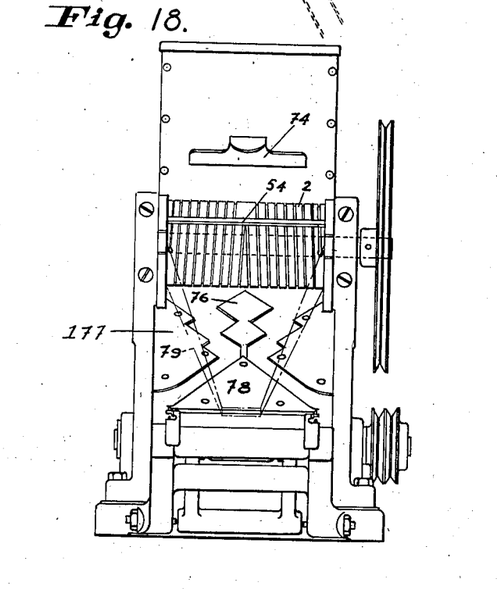
Figures 20, 21:
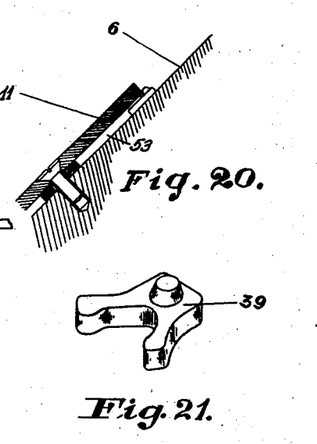
Fig. 20 is a detail cross sectional view through the orienting device.
Fig. 21 is a perspective view of a fastener member.

In Figs. 17 and 18 some modification of the hopper feed devices are shown. A loose mass of fastener elements are placed in a container 73 and are fed out continuously through an adjustable gate 74. They then approach the roller and inclined surface which operate in the manner already described. The directing baffles 76 and 77 are of modified design as seen in the drawings. A cover plate, not shown, preferably extends over the baffles and down almost to the end of orienting plate 78 which is of the same construction as plate 11.

During each revolution the bar 54 will carry over several fastener members. These are caught in a chute 79 which guides them to any suitable point where they can be returned to the container 73.

A modified form of pack pusher is also shown. A pivoted lever 80 has a head 81 having a slot corresponding to the cross-section of the rail 12, which may be curved to guide the head 81. Lever 80 is actuated through a link 82 by a suitable eccentric 83. A modified form of hammer vibrator 84 operated from a ratchet 85 is also illustrated.

My invention has many novel and advantageous features and it is my intention to claim not only my improved combination but also all novel subcombinations of parts or method steps which may be combined or used to advantage with various types of machines and methods. I have illustrated what now appears to be the best mode of carrying my invention into effect, but it is understood that a wide range of variations will occur to those skilled in the art, and the scope of my invention will be defined in the claims.

What I claim as new and desire to secure by Letters Patent of the United States is:

1. In a machine for making slide fastener stringers of the type having fastener members consisting of generally flat rectangularly spaced pieces each having clamping jaws which are spread apart at one end and at the other end a projection on one side and a recess on the other side, means for supporting and guiding such fastener members while nested in pack formation with the projection of each member fitting in the recess in the next adjacent member, means for applying a force on the pack to advance it forwardly along the supporting and guiding means, a pair of stop members having stop surfaces extending transversely of the line of movement of the pack and in the path of the spread apart jaws, said stop members being spaced apart slightly more than the width of a fastener member when the jaws are closed, means for guiding a tape between the open jaws of the forward end member of the pack, transversely operating clamping tools adjacent said stop members for closing the jaws of the end member of the pack to clamp it to the tape, and means for feeding the tape and attached member forwardly through the space between the stops to allow said pack advancing means to advance the next member to attaching position against the stop members.

2. In a machine for making fastener stringers of the class described, the combination with means for supporting a tape stringer, means for supplying fastener members successively in position to be attached to the tape, and means for attaching the fastener members to the tape one by one as they are supplied to attaching position; of intermittently operating tape feeding means for forward feeding of the tape between successive attaching operations, which includes a feed member designed to engage one fastener member only on the tape, means for moving said feed member immediately after attachment of each fastener member into positive engagement with the rear face of the last member attached to the tape and for further moving said feed member after it engages the fastener member to advance the tape by force applied directly to said last attached member, means for returning said feed member to its initial position, and gripping means operated by the machine for holding the tape stationary during such return movement of the feed member and for releasing the tape during forward movement of the feed member.

JOHN A. CHAPPUIS.